US006804293B1

United States Patent
Brakemeier

(10) Patent No.: US 6,804,293 B1
(45) Date of Patent: Oct. 12, 2004

(54) METHOD FOR EQUALISING A RECEIVE SIGNAL

(75) Inventor: Achim Brakemeier, Blaustein (DE)

(73) Assignee: Eads Radio Communication Systems GmbH & Co. KG (DE)

( * ) Notice: Subject to any disclaimer, the term of this patent is extended or adjusted under 35 U.S.C. 154(b) by 0 days.

(21) Appl. No.: 09/509,629

(22) PCT Filed: Sep. 16, 1998

(86) PCT No.: PCT/EP98/05891

§ 371 (c)(1),
(2), (4) Date: Mar. 30, 2000

(87) PCT Pub. No.: WO99/17457

PCT Pub. Date: Apr. 8, 1999

(30) Foreign Application Priority Data

Sep. 30, 1997  (DE) .......................................... 197 43 171

(51) Int. Cl.$^7$ ............................ H03H 7/30; H03K 5/159
(52) U.S. Cl. ...................... 375/233; 375/234; 375/350; 333/18; 333/28 R
(58) Field of Search ................................. 375/233, 234, 375/230, 231; 708/300, 322, 323; 333/18, 28 R

(56) References Cited

U.S. PATENT DOCUMENTS

| 5,182,749 A | * | 1/1993 | Kazecki et al. ............. 370/498 |
| 5,222,101 A | * | 6/1993 | Ariyavisitakul et al. .... 375/231 |
| 5,930,296 A | * | 7/1999 | Kot ............................. 375/233 |
| 6,028,901 A | * | 2/2000 | Huynh et al. ................ 375/350 |

FOREIGN PATENT DOCUMENTS

FR        0520969      * 12/1992      ........... H04L/25/30

* cited by examiner

Primary Examiner—Khai Tran
Assistant Examiner—Qutub Ghulamali
(74) Attorney, Agent, or Firm—Pendorf & Cutliff

(57) ABSTRACT

The invention relates to a method for equalizing a signal with a frame structure, received via a time-variable transmission channel. According to said method, a frame-type equalization is used. The channel unit pulse response is analyzed and one equalization alternative is selected from several provided alternatives. According to the principle of equalization with decision feedback, it is preferable if only two alternatives are provided; a conventional forward equalization and an inverse-time reversed equalization. A decision in favor of one or the other of these alternatives can be made simply based on the sign characterizing the so-called skewness.

10 Claims, 3 Drawing Sheets

METHOD FOR EQUALISING A RECEIVE SIGNAL

BACKGROUND OF THE INVENTION

1. Field of the Invention

The invention concerns a process for equalizing the distortion of a received signal.

2. Description of the Art

In transmission channels with multi-path propagation, the receiver must equalize the received signal prior to the evaluation of the information content. Various versions of equalizer filters are known; see for example the overview in Digital Medium Wave Radio Broadcasting from A. Brakemeier in telecom praxis 9/96, pages 33–38. For approximation of the channel impulse response (channel unit pulse response), which is necessary for setting the equalization filter, test sequences of known structure are incorporated in the transmitted signal, in particular so called PN-sequences or CAZAC-sequences.

One frequently employed equalization process is equalization with decision feedback (Decision Feedback Equalizer). The known equalization processes work satisfactorily in the case of transmission channels with trailing or lag signals which are weaker than the main signal, however show significant problems in particular in the case of the reverse signal power distribution.

SUMMARY OF THE INVENTION

The present invention is thus concerned with the task of improving a process of the above-described type in a manner that reduces the dependency of the equalization effectiveness on the structure of the channel impulse response.

The invention provides a process for equalization of a signal received via a time varying transmission channel and scanned via an equalizer filter (DFE), of which the filter coefficients are tuned or adjusted according to the value of an approximation of the channel impulse response on the basis of test sequences (TF) embedded in the signal which form signal frames ($R_n$, $R_{n+1}$) with data sequences (DF) enclosed between them, and thereby characterized, that from the approximation of the channel impulse response a determination is made as to the utilization of one of at least two different process paths for equalization, wherein it is possible to select between at least one forward equalization and one inverse-time reversed equalization.

The invention makes it possible, with small expenditure, to employ a particularly suitable alternative from among the many mentioned above, for carrying out equalization. The component and energy cost can be kept particularly small by allowing for only two different alternatives—in particular—one forwards equalization according to the conventional manner of proceeding, and one inverse-time reversed equalization. The decision between the different alternatives can be considered as a classification problem, for which a classifier can be set up. An advantageous and economical criteria for classification is the so-called slope or obliquity of the channel impulse response, or a function derived therefrom, which is simple to calculate and of which the plus or minus value provides, in a preferred embodiment of the invention, the selection of one of the two alternatives for equalization.

The allowance of a second, inverse-time reversed equalization besides the conventional forwards equalization has the advantage that for calculation of the filter coefficients for both alternatives the same rules for calculation can be utilized, with the exception of the supplemental or additional time inversion. The time loss due to the intermediate storage or buffering of the sample values or the therefrom derived values of a frame can be disregarded, since in any case as a result of the conventional interleaving and scrambling of the symbols an evaluation lag occurs. The frame-wise processing during the equalization offers beyond this still further advantages, for example, the taking into consideration of two channel impulse responses obtained using different test procedures.

BRIEF DESCRIPTION OF THE DRAWINGS

In the following, the invention will be described in greater detail on the basis of illustrative embodiments by reference to the figures. Therein there is shown.

DETAILED DESCRIPTION OF THE INVENTION

The received signal received in the receiver is influenced by the transmission characteristics of the transmission channel. Of the influences on the receiver signal, the primary focus here for processing concerns distortions resulting from multi-path propagation, which can also be time-varied.

With the aid of the test sequences, a data independent channel evaluation be carried out, in so far as the length of the test sequence is at least twice as large as the maximal length of the channel impulse response. The quality of the valuation of the channel impulse response depends directly upon the test symbols. Preferred are statically balanced test symbols, that is, test sequences with good correlation characteristics. Particularly good algorithms for evaluation of the channel surge response can then be employed, when the test sequence possesses a partial periodic internal structure. These and further characteristics of test sequences are already known and form the state of the art. The use of test sequences makes possible in particular also a frame synchronization of the received signal.

Figure 1:
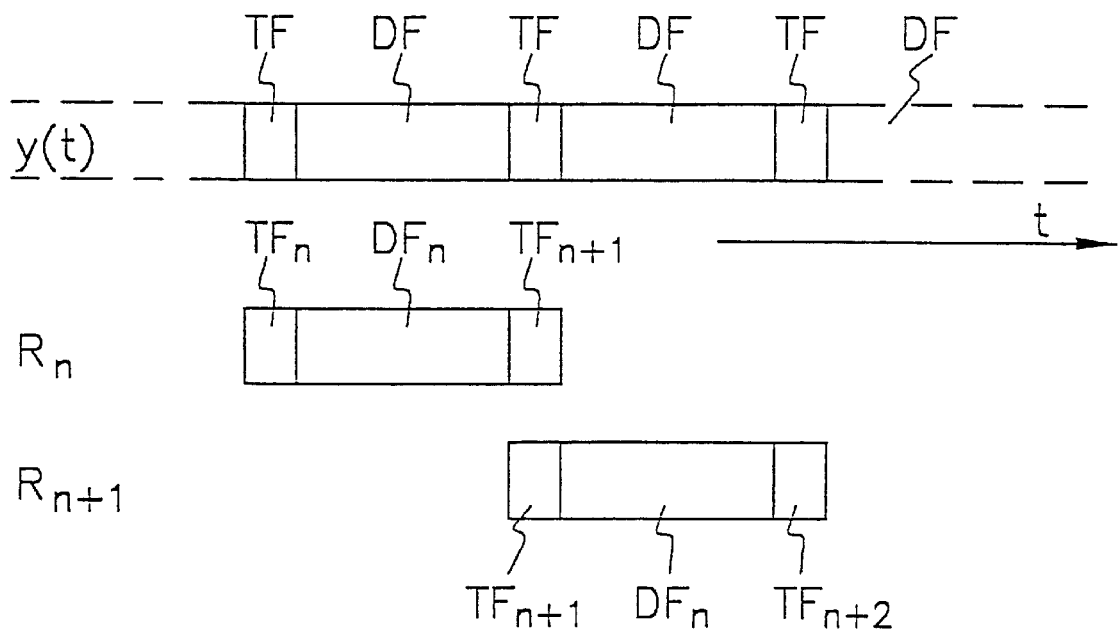
FIG. 1 a frame structure of a signal
Figure 2A:
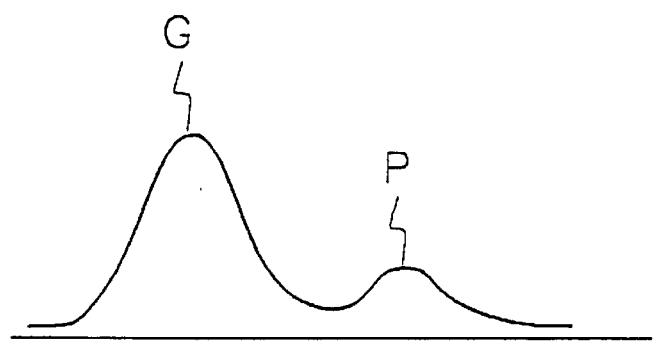
FIG. 2a a structure with a typical process for a channel impulse response

In FIG. 2a a typical process is diagrammed for a channel impulse response with two maxima recording to a more powerful ground or base wave G and a less powerful delayed space wave or indirect wave P. A conventional or customary equalizer with decision feed back provides with a distorted signal of this type totally satisfactory results for the equalized symbol. In the case of the structure of the channel impulse response of the type diagrammed in FIG. 2b with weaker ground wave G and stronger space wave or indirect wave P the same equalizer tends towards a higher failure rate or even to oscillating behavior.

In accordance with the invention various structures of the channel impulse response are distinguished and according to the determination of this distinction are subjected to the different alternatives of equalization, which are better adapted to the respective transmission characteristics of the channel.

Figure 2B:
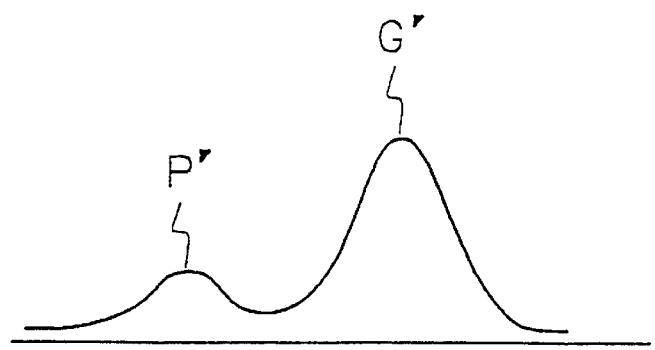
FIG. 2b a structure with a classification step with a right biased or loaded channel impulse response FIG. 3 a schematic representation of an inventive process FIG. 4 an equalizer with decisional feedback In a known manner, the sent signal y(t) is sub-divided into test sequences TF, of which the structure and symbol sequences also are already known on the receiver side, and data sequences DF framed in by these test sequences and containing the transmitted data content. For the purpose of the further explanation of the invention overlapping signal segments $R_n$, $R_{n+1}$ are considered as signal frames, which respectively at the beginning and at the end have test sequences TF, with the data sequence DF enclosed therebetween (FIG. 1).

For the case diagrammed in FIG. 2b the concerned frame is preferably treated in time inversion, so that the roles of ground wave and space wave can be exchanged. In such an inverse-time frame, an equalization can again be achieved with good success as in the channel situation according to FIG. 2a. This is referred to as inverse-time reversed equalization, in comparison to which the equalization without time inversion is referred to as conventional forwards equalization.

Figure 3:
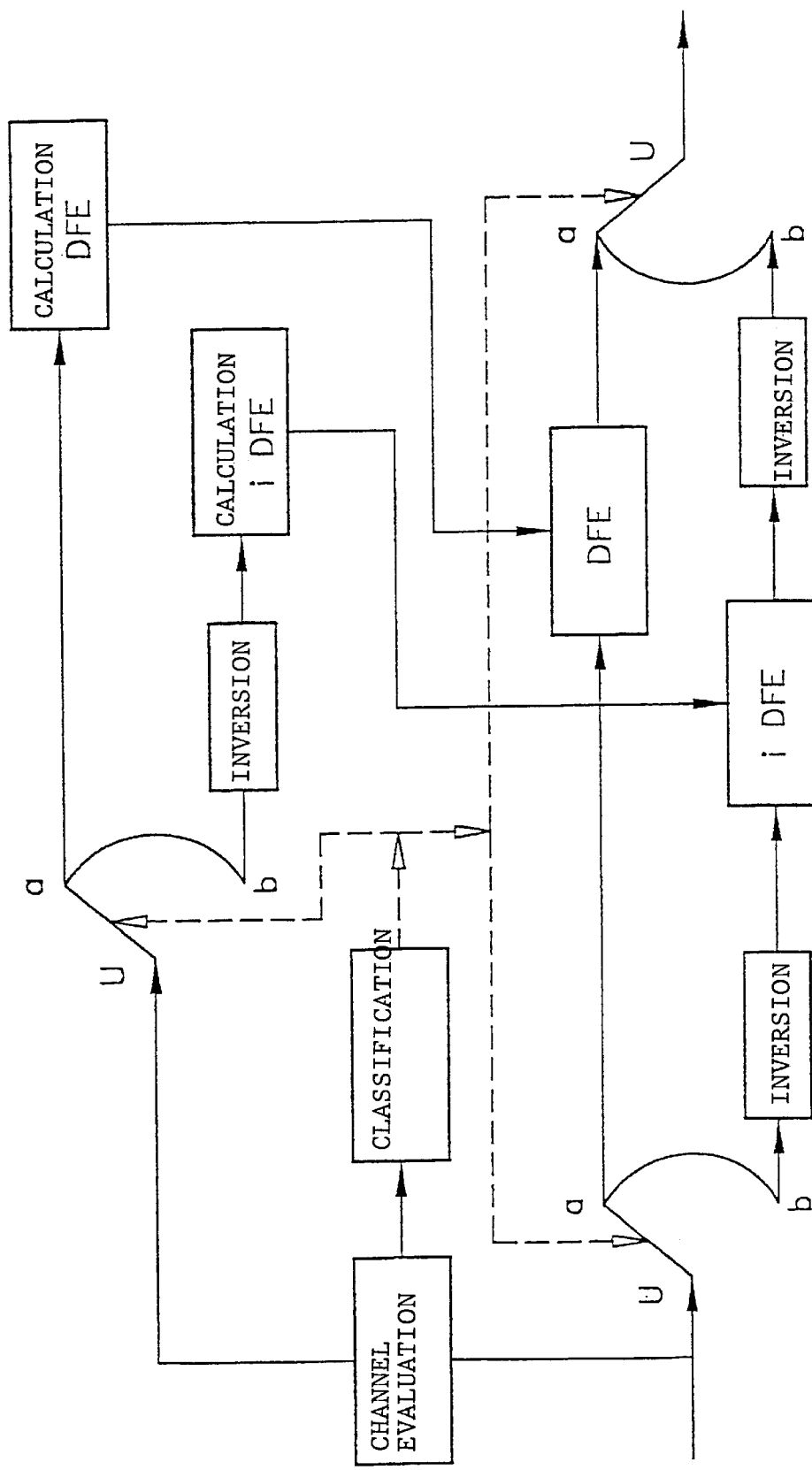

In FIG. 3 the flow or process is outlined for an inventive process with a conventional forwards equalization and an inverse-time reversed equalization. For a frame R an approximation or valuation of the channel impulse response is undertaken and on the basis of this evaluation a classification of the channel impulse response in one of two classes is undertaken. With reference to the diagrams contained in FIG. 2, in the following structures of the type shown in FIG. 2a will be referred to as left loaded or biased, the structures of the type diagrammed in FIG. 2b will be referred to as right biased. The further signal processing undertaken based upon the classification can be seen as parallel processing paths with reversing or changer-over switches U. The shown position a of the reversing switch corresponds to the equalization according to the conventional forwards method for left loaded channel impulse responses (FIG. 2a).

Figure 4:
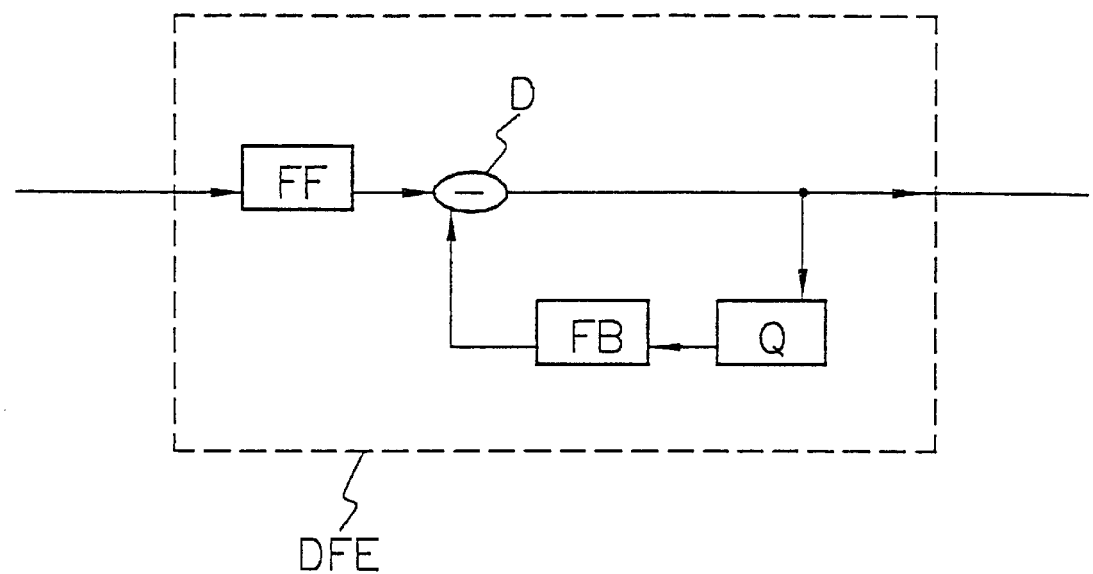

According to the decision to select the alternative for equalization, from the estimated or approximated channel impulse response the coefficient for setting or adjusting the equalizer is calculated. As for the manner of calculation, various rules or principles of the various equalizer types are known from the state of the art. The equalization filter DFE is adjusted with the calculated coefficient input and the data sequence of the frame being considered can be equalized or deciphered. The equalized data sequence can thereafter be decoded. The typical manner of function of an equalizer with decision feedback guidance is shown as a flow-chart in FIG. 4. The equalizer DFE thereby contains a first transversal filter FF in the path of the signal, a quantifier Q as well as a second transversal filter FB in a flow back branch and a subtraction step D. Individual components can be varied in design, in particular the quantifier can also be provided in the signal path and/or the first transversal filter can be sub-divided into two sequentially arranged partial filters, whereby the first partial filter in particular can be a channel matched filter or preferably a channel mismatched filter. The calculation of the equalizer adjustment provides coefficients for all filters or, as the case may be, partial filters to be set or adjusted. Besides the direct calculation of the equalization coefficients these can also at least partially be adjusted iteratively.

If in the classification step also a right biased or loaded channel impulse response (FIG. 2b) is detected, so then the calculation of the filter coefficient is carried out in accordance with a inverse-time channel impulse response, which in FIG. 3 corresponds to an adjustment b of the converter or redirector U. The time inversion is also applied to the sample value of the relevant frame, before this is fed to the equalizer filter iDFE adjusted according to the inverse-time channel impulse response. The output symbol sequence of the equalizer is again time inverted and is therewith again available in time correct symbol sequence for decoding.

In contrast to the conventional equalization process or operation, in which the data can be pushed synchronized through the filter at the sampled tempo, in the invention, at least in the reversed equalization, processing is carried out frame-wise. The equalization can thereby also be carried out with substantially higher processing speed.

The frame-wise processing for all cases of classification with intermediate storage of the sensed values makes possible advantageously a better adaptation or fitting of the equalization adjustment to time variable channels, in that before the classification both one data sequence $DF_n$ framing test sequences $TF_{n1}$ $TF_{n+1}$ for evaluation of respectively one channel impulse response are drawn upon or consulted. The classification can then be supported on both channel impulse responses, for example by averaging the channel impulse responses or by selection of the channel impulse response obtained with the stronger power or the test sequence signal with less static or the like. Thereby for example a fading occurring during the test sequence can be bridged over.

In the calculation of the equalization adjustment or setting, preferably that channel impulse response is evaluated of which during equalization the sample value is first fed into the equalization filter. In the case of forward equalization, the frame $R_n$ as well as the channel impulse response from the test sequence $TF_n$, and during reversed equalization the channel impulse response from the test sequence $TF_{n+1}$. In the case of rapid time changing transmission channels, for example with strong phase rotation, the equalization filter can also adaptively track or follow, in interpolation is made between the channel impulse responses of the two test sequences $TF_n$, $TF_{n+1}$.

In comparison to the likewise conceivable combination of a forwards and a reversed equalization, which respectively extend over only one-half frame length, or which after the equalization are subjected to one best selection, the selection of an alternative has the advantage of the substantially smaller processing complexity or cost, since in particular only one equalization adjustment or setting must be determined.

The classification of the channel impulse response offers a comparatively particularly economical and simple alternative, whereby in particular a classification of the channel impulse response on the basis of the so-called slope of a function is advantageous. For this, for the analysis of the channel impulse response with discreet value $a_i$, this is converted in a discreet probability curve $$Pi=|h_i|^r/E_H \text{ with } E_H=\Sigma|h_i|^r$$

whereby the norm r>0 determines the type of conversion.

Preferably r=2 is selected. Then $E_h$ represents the energy of the channel impulse response. The summation extends over all sample values i of the channel impulse response.

Besides the average values and standard deviations, there are also calculated higher moments of the discreet probability curve $P_i$. The mean in the sense of the center of gravity of the channel impulse response can be reduced to $$\mu=\Sigma i \cdot P_i$$

The standard deviation a is calculated in the normal manner as $$\sigma=\sqrt{\Sigma(i-\mu)^{3} \cdot P_{i}/\sigma^{3}}$$

The so-called slope is resolved to $$s(h)=\Sigma(i-\mu)^3 \cdot P_i/\sigma^3.$$

The classification of the channel impulse response is advantageously carried out on the basis of the value for the slope. In particular, solely from the plus or minus value of the slope, a classification of the type can be carried out, so that in the case of positive slope the channel impulse response is left biased, and in the case of negative slope it can in comparison be classified as right biased and the appropriate alternatives for equalization are selected.

In the preferred employment of an equalizer with decision feedback, the inverse-time signal processing in the inverse-time equalizer is only necessary for the return path of the equalizer.

The transverse filter FF in the through-going signal path can be employed in the conventional manner. For this, the equalization coefficients are calculated from the inverse-time channel impulse response. The obtained coefficients for the first transversal filter FF are again time inverted. Thereafter the filtering can occur in the first transversal filter in the normal time sequence of the received signal.

The invention is not limited to the above-described illustrative embodiments, but rather is variable in different ways in the framework of the understanding of the person of ordinary skill in the art.

What is claimed is:

1. A process for equalizing a signal which comprises:
   receiving the signal via a time varying transmission channel, wherein test sequences (TF) are embedded in the signal, and wherein said test sequences form signal frames ($R_n$, $R_{n+1}$) with data sequences (DF) enclosed between said signal frames,
   approximating a channel impulse response on the basis of the test sequences (TF),
   scanning the signal via an equalizer filter (DFE), wherein said equalizer filter's filter coefficients are adjusted according to said approximation of the channel impulse response,
   selecting one of at least two different process paths for equalization from the approximation of the channel impulse response, wherein at least one of the process paths for equalization is forward equalization and wherein at least one of the process paths for equalization is inverse-time reversed equalization, and
   equalizing the signal using the selected process path for equalization.

2. A process according to claim 1, wherein said selection is determined from a time sequence of maxima of the channel impulse response.

3. A process according to claim 1, wherein said selection is determined from a slope of the channel impulse response.

4. A process according to claim 3, wherein said selection is determined from a value of a sign of the slopes (plus or minus).

5. A process according to claim 1, wherein the channel impulse response at a frame beginning is used for calculation of the filter coefficients for the forwards equalization, and a channel surge response at a frame end is employed for the inverse-time reversed equalization.

6. A process according to claim 1, wherein the filter coefficients are calculated from an averaged channel impulse response.

7. A process according to claim 1, wherein equalization occurs adaptively according to an interpolation between at least two test channel impulse responses of different test sequences ($TF_n$, $TF_{n+1}$).

8. A process according to claim 1, wherein decisional feedback is employed for said equalizer filter (DFE) and equalizing.

9. A process according to claim 1, wherein a mismatched filter is used as the equalizer filter (DFE).

10. A process for equalizing a signal which comprises:
    receiving the signal via a time varying transmission channel, wherein test sequences (TF) are embedded in the signal, and wherein said test sequences form signal frames ($R_n$, $R_{n+1}$) with data sequences (DF) enclosed between said signal frames,
    approximating a channel impulse response on the basis of the test sequences (TF),
    scanning the signal via an equalizer filter (DFE), wherein said equalizer filter's filter coefficients are adjusted according to said approximation of the channel impulse response,
    selecting one of at least two different process paths for equalization from the approximation of the channel impulse response, wherein at least one of the process paths for equalization is forward equalization and wherein at least one of the process paths for equalization is inverse-time reversed equalization, and
    equalizing the signal using the selected process path for equalization, wherein
    a) said filter coefficients are calculated from a time-inverted channel impulse response,
    b) the embedded sample values or the therefrom derived values of the frame ($R_n$, $R_{n+1}$) are processed in time-inverted sequence through said equalizer filter (DFE), and
    c) the sequence of the equalized symbols are again time-inverted.

* * * * *